US006980286B1

(12) United States Patent
Feng

(10) Patent No.: US 6,980,286 B1
(45) Date of Patent: Dec. 27, 2005

(54) ULTRA-THIN OPTICAL FINGERPRINT SENSOR WITH ANAMORPHIC OPTICS

(75) Inventor: Chen Feng, Bothell, WA (US)

(73) Assignee: IC Media Corporation, Seoul (KR)

( * ) Notice: Subject to any disclaimer, the term of this patent is extended or adjusted under 35 U.S.C. 154(b) by 712 days.

(21) Appl. No.: 10/002,420

(22) Filed: Oct. 25, 2001

(51) Int. Cl.⁷ ............................................. G01K 9/74
(52) U.S. Cl. ..................................................... 356/71
(58) Field of Search ......................................... 356/71

(56) References Cited

U.S. PATENT DOCUMENTS

| 5,629,764 A | 5/1997 | Bahuguna et al. |
| 5,892,599 A | 4/1999 | Bahuguna |
| 6,240,200 B1 | 5/2001 | Wendt et al. |
| 6,657,185 B2 * | 12/2003 | Shiratsuki et al. ....... 250/227.2 |

* cited by examiner

Primary Examiner—Gregory J. Toatley, Jr.
Assistant Examiner—Amanda Merlino
(74) Attorney, Agent, or Firm—Fernandez & Associates, LLP

(57) ABSTRACT

Disclosed is an ultra-thin optical imaging sensor with anamorphic optics comprising of an image capturing panel an anamorphic optical lens of at least two optical magnification powers, and an imaging sensor. The image sensor captures a light reflection from an image deposited on the image capturing panel, which is optically compensated by the anamorphic optical lens. In the preferred embodiment, a folding mirror and a bending mirror is also provided to provide compactness to fold an incoming image towards the anamorphic lens, and the bending mirror then bends the compensated image received from the anamorphic lens to direct that image to an image sensor.

30 Claims, 5 Drawing Sheets

ULTRA-THIN OPTICAL FINGERPRINT SENSOR WITH ANAMORPHIC OPTICS

FIELD OF INVENTION

The present invention relates generally to anamorphic optics and more specifically, how it can be applied in the field of fingerprint-capturing devices, scanners, and imaging sensors.

BACKGROUND INFORMATION

Traditional optical fingerprint sensor devices, such as shown in FIG. 1, use a prism or a component equivalent to the prism, such as grating, to capture fingerprint images, but suffer from perspective distortion in which an image is skewed and distorted. Holographic phase grating to the prism was added to normalize the optical axis of an imaging lens 110 to the plane of the imaging lens. Problems with such devices include: (1) external light would creep in and essentially create noise within the image contrast leading to a loss of definition of the image, (2) dirt and residue which remained on the prism or reflecting face would blur and obstruct the scanned image, (3) image distortion, as previously mentioned above, and (4) the difficulty in receiving images of different sizes due to the preset length between the corrective lens and the imaging device. Another form of prior art sensor calls for a series of prisms, comprising of light emitters and detectors, to compensate for the distortion problem. This prior art approach, however, occupies too much space and limits flexibility.

Accordingly, there is a need to provide a fingerprint sensor using anamorphic optics, which mitigates the distortion problem, is flexible in size, and has the ability to obtain different or optimum images.

SUMMARY OF INVENTION

The invention employs anamorphic optics for use in an image capturing device for recovering an image. Anamorphic optics can be defined as having or producing unequal magnifications along two axes perpendicular to each other, which creates different optical imaging effects. The imaging device comprises a pair of cylindrical lenses, a folded imaging path, a light source, a folding mirror, a clear capturing panel, a bending mirror, an imaging sensor, and a power source. Distortions are minimized with anamorphic lenses, preferably a horizontal lens and a vertical lens, via selections of optical magnifications in two directions of the anamorphic lenses. The folded imaging path reduces and minimizes the size of the module to allow an ultra-thin imaging device. Preferably, a single-chip imaging sensor receives a minimal or distortion-free fingerprint image and outputs a corresponding video image for further processing.

DETAILED DESCRIPTION OF DRAWINGS

Figure 1:
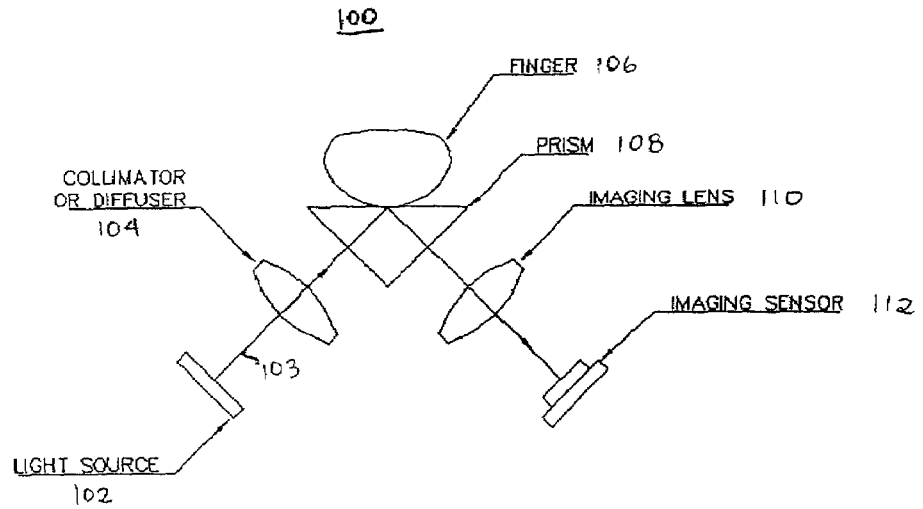
FIG. 1 illustrates a typical prior art optical fingerprint-capturing device.
Figure 2:
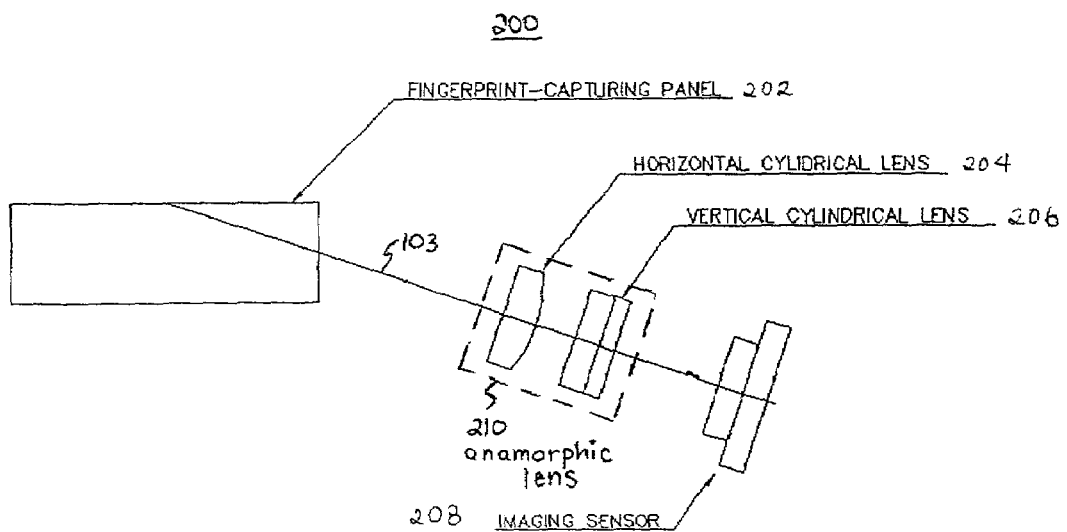
FIG. 2 shows an ultra-thin optical fingerprint sensor with anamorphic optics as provided in accordance with the principles of this invention.

FIG. 2 shows an ultra-thin optical fingerprint sensor 200 with anamorphic optics as provided in accordance with the principles of this invention. Light path 103 enters through an image receiving panel 202, where an image, such as a fingerprint is deposited. Light beam 103, reflected from the deposited image, travels through an anamorphic lens 210, preferably comprising a horizontal cylindrical lens 204 and a vertical cylindrical lens 206, which provides reduction in perspective distortion. Light path 103 strikes the image capture device 208, such as an image sensor that receives the compensated image from anamorphic lens 210. Imaging sensor 208 comprises a camera, a charge coupled device (CCD) or a CMOS imager, although image capture device 208 need not be limited to these types of image capture devices.

The present invention allows the image deposited to enter receiving panel 202 at an angle much greater than 90 degrees. Horizontal cylindrical lens 204, with a preferred radius approximately around 3.28 mm generally produces a weak magnification power around 1.8–2.2. The vertical cylindrical lens 206, with a preferred radius approximately around 2.0 mm, produces a stronger magnification power of around 6–8. Together, horizontal lens 204 and vertical lens 206 form an anamorphic lens 210 to produce unequal magnifications along 2 axes perpendicular to one another to thereby compensate for perspective distortion. Alternatively, to reduce aberrations, horizontal lens 204 and vertical lens 203 may be replaced with simple plano-convex cylindrical lenses with aspheric surfaces.

The magnification power of lens 210 is conditioned upon the distance from image receiving panel 202 to lens 210 and on the angle at which image path 103 enters receiving panel 202 and strikes the horizontal lens 204 and vertical lens 206. In the preferred embodiment, the magnification power can be pre-selected, or selectively adjusted via adjustments of distance and angle between panel 202 and anamorphic lens 210. Image quality thus may be adjusted to avoid aberrations in the captured image, thereby allowing an image to be captured at a myriad of lengths or distances without creating a great amount of distortion.

Figure 3:
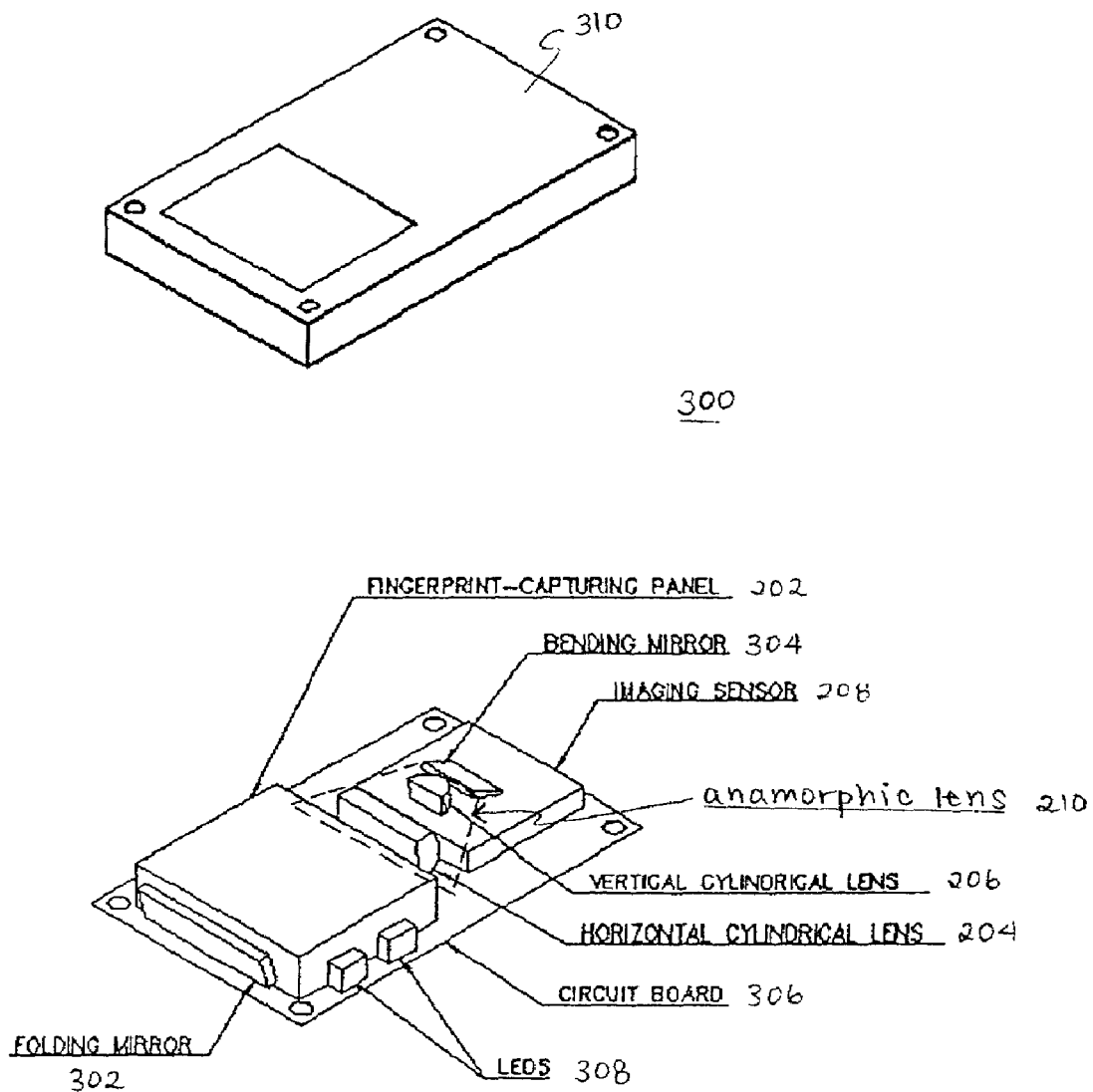
FIG. 3 illustrates an alternative and preferred embodiment of the ultra-thin fingerprint sensor as provided in accordance with the principles of this invention.

FIG. 3 illustrates an alternative and preferred embodiment of the ultra-thin fingerprint sensor 300 as provided in accordance with the principles of this invention. Similar to the image sensor 200 of FIG. 2, image sensor 300 comprises an image receiving panel 202, an anamorphic lens 210 comprising a horizontal cylindrical lens 204 and a vertical cylindrical lens 206, and an image sensor 208. In addition, preferably a cover 310 with an optically clear panel 312 is provided. A folding mirror 302, a bending mirror 304, a circuit board 306, and light-emitting diodes (LED) 308 or other light sources are also preferably added to ultra-thin fingerprint sensor 300.

Image receiving panel 202 preferably comprises an optically clear panel, such as clear polished glass, polycarbonate, plastic, etc. for accurate reflection of the deposited image. In the preferred embodiment, when an image, such as a finger, touches receiving panel 202, the area where the finger occupies is white. The property of air changes on the outside of clear panel 202, so the image capturing area is black where only air is present on the surface of panel 202. When an image like a finger obstructs the air, light will reflect off the image area to folding mirror 302. Alternatively, to reduce ambient and external light from entering imaging path 103, a coating of a narrow band-pass filter can be applied to image receiving panel 202.

Figure 4:
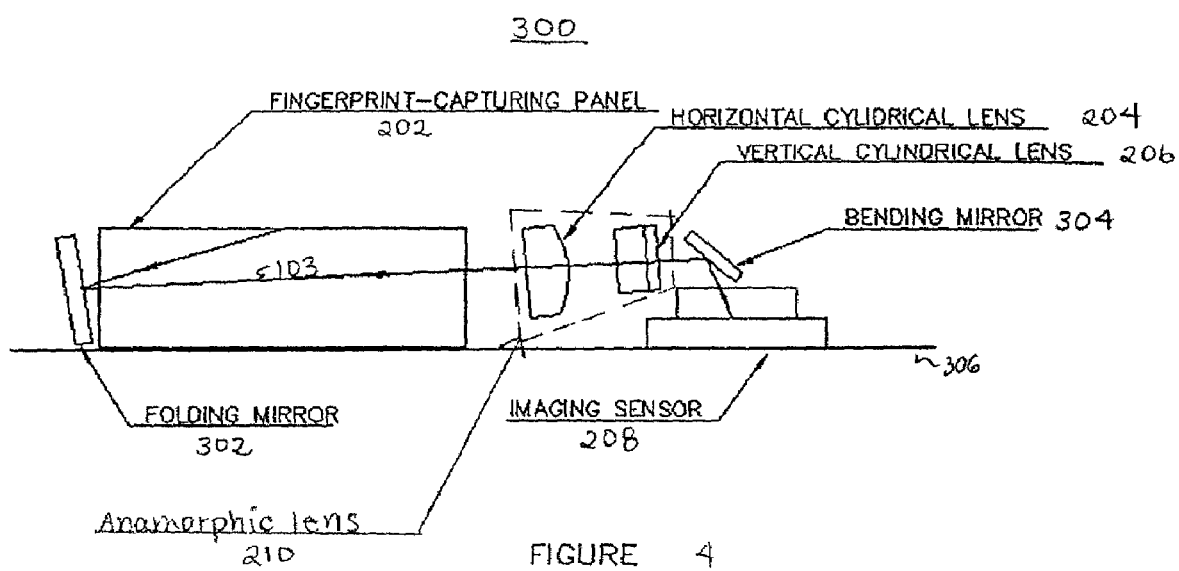
FIG. 4 is a more detailed cross-sectional view of the fingerprint sensor of FIG. 3.

FIG. 4 is a more detailed cross-sectional view of the fingerprint sensor 300. Light path 103 enters through the top surface of receiving panel 202 and is reflected from one end of image receiving panel 202 to the other with the utilization of folding mirror 302. Light beam 103 exits out of panel 202 and strikes anamorphic lens 210, first horizontal cylindrical lens 204, then vertical cylindrical lens 206, and is diffracted with bending mirror 304 onto imaging sensor 208. Image sensor 208 preferably is coupled on a circuit board 306. Bending mirror 304 reflects image beam 103 onto image sensor 208. Image sensor 208, as previously mentioned may comprise CCD or a CMOS sensor in applications such as fingerprint sensors, as scanners, or as part of a security component for portable devices like cameras, cell phones, laptops or other devices.

The addition of folding mirror 302, allows reduction in the device size by folding image beam 103, altering ray direction to be much greater than 90 degrees, closer to 180 degrees. Bending mirror 304 also aids in compacting device 300, by causing the ray direction change to be smaller than 90 degrees, or close to 90 degrees. Accordingly, folding mirror 302 and bending mirror 304 further reduce the size of the module from FIG. 2 to provide an alternate compact approach to image sensor devices. Furthermore, by alternatively coating the tilted edge of image receiving panel 202 with enhanced aluminum, the two components of folding mirror 302 and image receiving panel 202 may be combined to further reduce the size of the device. Alternatively, for further reduction in the size of the device, horizontal lens 204 and vertical lens 206 may be replaced with one lens having two different magnifications, or the horizontal cylindrical lens 204 may be combined with image receiving panel 202 with a convex cylindrical edge. Alternatively, folding mirror 302 may be replaced with a concave mirror to form a tele-centric imaging system, which relieves any residual key stone distortion.

Light-emitting diodes (LED) 308 are light sources that contribute to a reflection of light off the image, when an image is deposited on image receiving panel 202. LED's 308 are preferably perpendicular to beam 103, oriented on a different plane from light path 103, horizontal lens 204, and vertical lens 206. For example in FIG. 4, LED's 308 are preferably perpendicular to folding mirror 302 and fall within the area of capturing panel 202. The light sources may include but need not be limited to, LED's 308, daylight, or any other ambient light present.

Ultra-thin optical imaging device comprises a light source 103, coupled to the clear panel 312, coupled to anamorphic optics lens 210, coupled to the imaging sensor 208, preferably also coupled to a communication or signaling protocol, such as Universal Serial Bus (USB) (not shown), and coupled to a computer. The device also preferably comprises a power regulator (not shown) which is coupled to three different components: the light source 103; the imaging sensor 208; and the Universal Serial Bus. The USB preferably comprises a single sensor chip that performs all the sensor control, image capturing, image precondition, encoding, and video transmission in accordance with the principles of this invention. The communication or signaling protocol may be, but need not be limited to USB, IEEE 1394 (FireWire), or other similar comparable interface specifications. Power may be provided via the USB bus and can be controlled by a computer.

Figure 5:
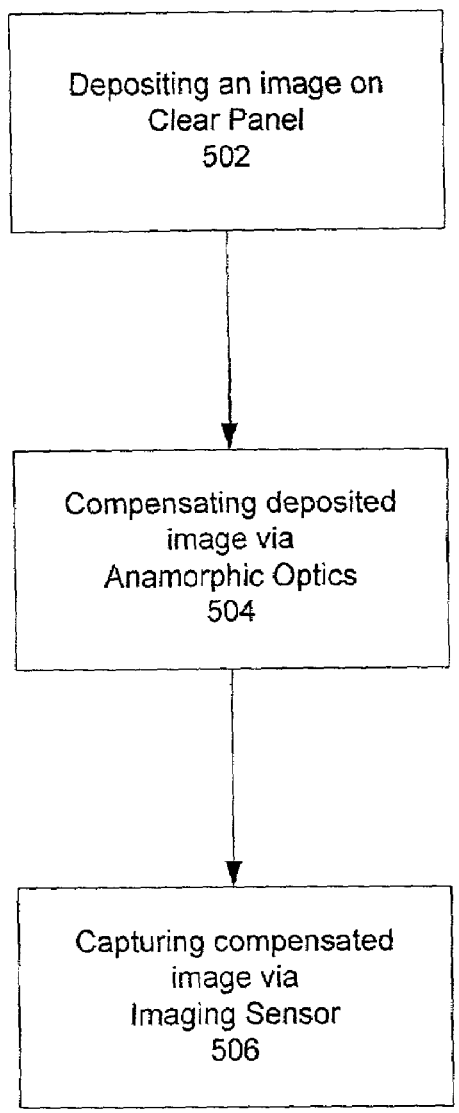
FIG. 5 is a general block diagram of an ultra-thin optical fingerprint sensor method with anamorphic optics provided in accordance with the principles of this invention.

FIG. 5 is a general block diagram of an ultra-thin optical fingerprint sensor with anamorphic optics method provided in accordance with the principles of this invention. In a first step 502 of method 500, an image is deposited on an image receiving panel, preferably of optically clear material. In a second step 504, an anamorphic optical lens compensates the deposited image. In a third step 506, an image sensor captures the compensated image.

Figure 6:
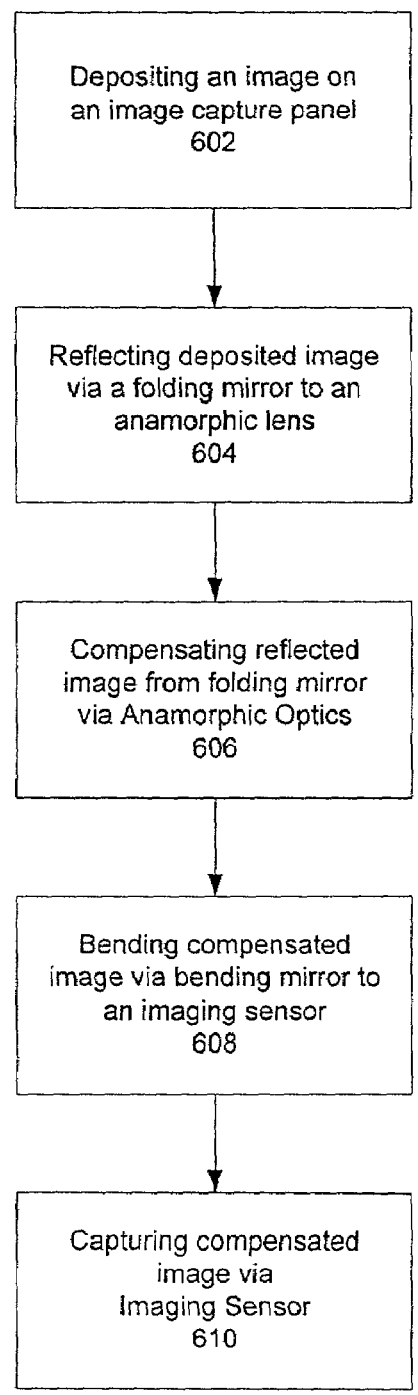
FIG. 6 is an alternative embodiment of an ultra-thin optical fingerprint sensor method with anamorphic optics provided in accordance with the principles of this invention.

FIG. 6 is an alternative embodiment of an ultra-thin optical fingerprint sensor method with anamorphic optics provided in accordance with the principles of this invention. In a first step 602, an image is deposited on image receiving panel. In a second step 604, a folding mirror reflects the deposited image to an anamorphic lens. In a third step 606, the anamorphic optics compensates the reflected image. In a fourth step 608, a bending mirror bends the compensated image and direct that image to be captured to an image sensor. In a fifth step 610, the image sensor captures the compensated image.

Foregoing described embodiments of the invention are provided as illustrations and descriptions. As previously mentioned, it is contemplated as within the scope of this invention that the ultra compact optical image sensor described can be implemented in a variety of applications, in addition to fingerprint sensors, optical scanners, or other such image sensor devices. In particular, Applicant contemplates that functional implementation of invention described herein may be implemented equivalently in hardware, software, firmware, and/or other available functional components or building blocks. Other variations and embodiments are possible in light of above teachings, and it is thus intended that the scope of invention not be limited by this Detailed Description, but rather by claims following.

What is claimed is:

1. An ultra-thin optical fingerprint sensor with anamorphic optics comprising:
    an image receiving panel;
    an anamorphic optical lens of at least two optical magnification power;
    a light source to illuminate the image receiving panel creating an illuminating light path;
    a folding mirror to fold a light reflection from an image deposited on the image receiving panel through the image receiving panel to the anamorphic lens creating a folded light path; and
    an image sensor; wherein the image sensor captures the light reflection optically compensated by the anamorphic optical lens;
  wherein the folded light path defines a plane; wherein the illuminating light path does not lie in the plane; and wherein the illuminating path is substantially parallel to said image receiving panel.

2. The ultra-thin optical fingerprint sensor of claim 1 wherein the anamorphic optical lens comprises a horizontal cylindrical lens and a vertical cylindrical lens.

3. The ultra-thin optical fingerprint sensor of claim 1 wherein the illuminating light path is substantially perpendicular to the plane; wherein the folding mirror folds the folded light path by substantially 180 degrees.

4. The ultra-thin optical fingerprint sensor of claim 3 wherein the light source comprises a light emitting diode (LED).

5. An ultra-thin optical scanner with anamorphic optics comprising:

an image receiving panel;
an anamorphic optical lens of at least two optical magnification power;
a light source to illuminate the image receiving panel creating an illuminating light path;
a folding mirror to fold a light reflection from an image deposited on the image capturing panel through the image capturing panel to the anamorphic lens creating a folded light path; and
an image sensor; wherein the image sensor captures the light reflection optically compensated by the anamorphic optical lens;
wherein the folded light path defines a plane; wherein the illuminating light path does not lie in the plane; and wherein the illuminating path is substantially parallel to said image receiving panel.

6. The ultra-thin optical scanner of claim 5 wherein the anamorphic optical lens comprises a horizontal cylindrical lens and a vertical cylindrical lens.

7. The ultra-thin optical scanner of claim 5 wherein the illuminating light path is substantially perpendicular to the plane; wherein the folding mirror folds the folded light path by substantially 180 degrees.

8. The ultra-thin optical scanner of claim 7 wherein the light source comprises a light emitting diode (LED).

9. An ultra-thin optical image sensor with anamorphic optics comprising:
an image receiving panel;
an anamorphic optical lens of at least two optical magnification power;
a light source to illuminate the image receiving panel creating an illuminating light path;
a folding mirror to fold a light reflection from an image deposited on the image capturing panel through the image capturing panel to the anamorphic lens creating a folded light path; and
an image sensor; wherein the image sensor captures the light reflection optically compensated by the anamorphic optical lens;
wherein the folded light path defines a plane; wherein the illuminating light path does not lie in the plane; and wherein the illuminating path is substantially parallel to said image receiving panel.

10. The ultra-thin optical image sensor of claim 9 wherein the anamorphic optical lens comprises a horizontal cylindrical lens and a vertical cylindrical lens.

11. The ultra-thin optical image sensor of claim 9 wherein the illuminating light path is substantially perpendicular to the plane; wherein the folding mirror folds the folded light path by substantially 180 degrees.

12. The ultra-thin optical image sensor of claim 11 wherein the light source comprises a light emitting diode (LED).

13. The ultra-thin optical fingerprint sensor of claim 1 further comprising a bending mirror to bend the light reflection from the anamorphic lens to the image sensor.

14. The ultra-thin optical fingerprint sensor of claim 13 wherein the anamorphic optical lens comprises a horizontal cylindrical lens and a vertical cylindrical lens.

15. The ultra-thin optical fingerprint sensor of claim 13 wherein the illuminating light path is substantially perpendicular to the plane; wherein the folding mirror folds the folded light path by substantially 180 degrees.

16. The ultra-thin optical fingerprint sensor of claim 15 wherein the light source comprises a light emitting diode (LED).

17. The ultra-thin optical scanner of claim 5 further comprising a bending mirror to bend the light reflection from the anamorphic lens to the image sensor.

18. The ultra-thin optical scanner of claim 17 wherein the anamorphic optical lens comprises a horizontal cylindrical lens and a vertical cylindrical lens.

19. The ultra-thin optical scanner of claim 17 wherein the illuminating light path is substantially perpendicular to the plane; wherein the folding mirror folds the folded light path by substantially 180 degrees.

20. The ultra-thin optical scanner of claim 19 wherein the light source comprises a light emitting diode (LED).

21. The ultra-thin optical image sensor of claim 9 further comprising a bending mirror to bend the light reflection from the anamorphic lens to the image sensor.

22. The ultra-thin optical image sensor of claim 21 wherein the anamorphic optical lens comprises a horizontal cylindrical lens and a vertical cylindrical lens.

23. The ultra-thin optical image sensor of claim 21 wherein the illuminating light path is substantially perpendicular to the plane; wherein the folding mirror folds the folded light path by substantially 180 degrees.

24. The ultra-thin optical image sensor of claim 23 wherein the light source comprises a light emitting diode (LED).

25. A method for ultra-thin optical fingerprint sensor comprising:
illuminating an image receiving panel via a light source creating an illuminating light path, wherein the illuminating light path is substantially parallel to said image receiving panel;
receiving an image on the image receiving panel;
folding a light reflection from the image through the image receiving panel to an anamorphic lens creating a folded light path; wherein the folded light path defines a plane; wherein the illuminating light path does not lie in the plane;
processing the received image through the anamorphic lens; and
capturing and storing the processed image from the anamorphic lens.

26. A method for ultra-thin optical scanner comprising:
illuminating an image receiving panel via a light source creating an illuminating light path, wherein the illuminating light path is substantially parallel to said image receiving panel;
receiving an image on the image receiving panel;
folding a light reflection from the image through the image receiving panel to an anamorphic lens creating a folded light path; wherein the folded light path defines a plane; wherein the illuminating light path does not lie in the plane;
processing the received image through the anamorphic lens; and
capturing and storing the processed image from the anamorphic lens.

27. A method for ultra-thin optical image sensor comprising:
illuminating an image receiving panel via a light source creating an illuminating light path, wherein the illuminating light path is substantially parallel to said image receiving pane;
receiving an image on the image receiving panel;
folding a light reflection from the image through the image receiving panel to an anamorphic lens creating a folded light path; wherein the folded light path defines a plane; wherein the illuminating light path does not lie in the plane;

processing the received image through the anamorphic lens; and capturing and storing the processed image from the anamorphic lens.

28. The method of claim 25 wherein the step of processing the received image comprises:

compensating the received image with the anamorphic lens; and bending the light reflection via a bending mirror to direct the compensated image towards an image sensor to capture the compensated image.

29. The method of claim 26 wherein the step of processing the received image comprises:

compensating the received image with the anamorphic lens; and bending the light reflection via a bending mirror to direct the compensated image towards an image sensor to capture the compensated image.

30. The method of claim 27 wherein the step of processing the received image comprises:

compensating the received image with the anamorphic lens; and bending the light reflection via a bending mirror to direct the compensated image towards an image sensor to capture the compensated image.

* * * * *